(12) United States Patent
Kanade et al.

(10) Patent No.: US 8,209,841 B2
(45) Date of Patent: Jul. 3, 2012

(54) METHOD OF MANUFACTURING MULTICOLORED ILLUMINATOR

(75) Inventors: Udayan Kanade, Pune (IN); Gaurav Kulkarni, Pune (IN); Karthikk Sridharan, Minneapolis, MN (US); Manas Alekar, Irvine, CA (US); Manohar Joshi, Los Angeles, CA (US); Sanat Ganu, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 283 days.

(21) Appl. No.: 12/663,285

(22) PCT Filed: Jun. 5, 2008

(86) PCT No.: PCT/IB2008/052195
§ 371 (c)(1),
(2), (4) Date: Dec. 7, 2009

(87) PCT Pub. No.: WO2008/149305
PCT Pub. Date: Dec. 11, 2008

(65) Prior Publication Data
US 2010/0170075 A1      Jul. 8, 2010

(30) Foreign Application Priority Data

Jun. 5, 2007   (IN) .......................... 1058/MUM/2007

(51) Int. Cl.
B21D 39/00      (2006.01)
B32B 17/06      (2006.01)
(52) U.S. Cl. .............. 29/428; 29/458; 156/99; 156/297; 428/426
(58) Field of Classification Search ................ 29/428, 29/458; 349/187; 156/99, 101, 297, 300, 156/301; 362/341; 428/426
See application file for complete search history.

(56) References Cited

U.S. PATENT DOCUMENTS

| 6,147,726 | A  | * | 11/2000 | Kubota et al. ................ 349/74 |
| 6,266,123 | B1 | * | 7/2001  | Maejima et al. .............. 349/160 |
| 6,270,604 | B1 |   | 8/2001  | McCallion |
| 6,314,759 | B1 | * | 11/2001 | Nihashi ........................... 65/43 |
| 7,006,286 | B2 | * | 2/2006  | Satake et al. ............. 359/487.02 |

FOREIGN PATENT DOCUMENTS

WO       2008/052195      11/2008
* cited by examiner

*Primary Examiner* — Jermie Cozart

(57) ABSTRACT

A method of manufacturing a multicolored illuminator is disclosed. In an embodiment, a first transparent sheet comprising light diffusing particles is provided. Second and third transparent cladding sheets are provided on either sides of the first transparent sheet. A mirror is provided adjacent to the second sheet. The first sheet, second sheet, third sheet and mirror are merged to give a multicolored illuminator.

13 Claims, 9 Drawing Sheets

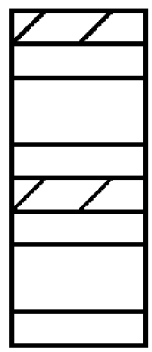
FIG 5A
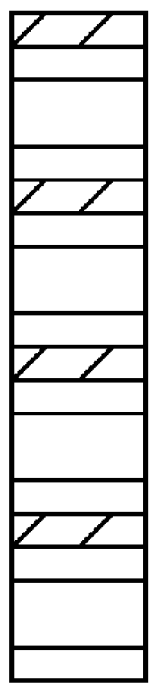
FIG 5B
FIG 5C

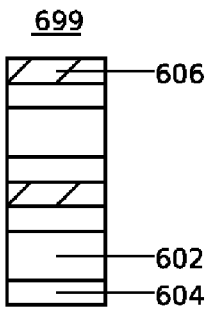
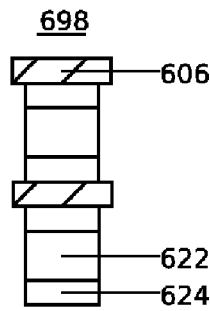
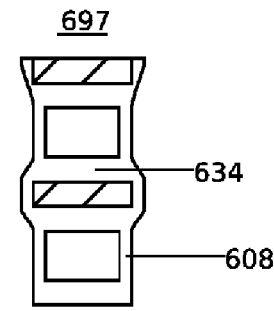
FIG 6A          FIG 6B          FIG 6C
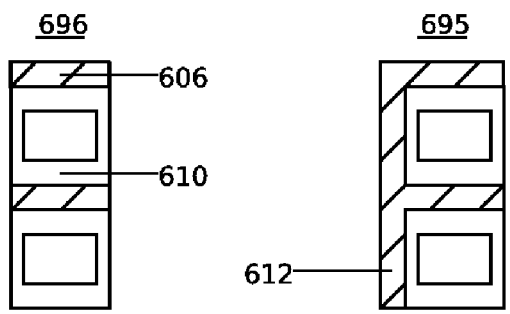
FIG 6D          FIG 6E
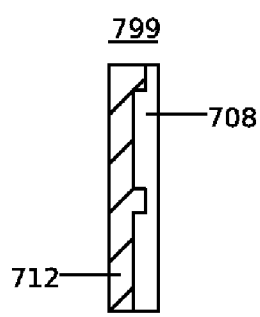
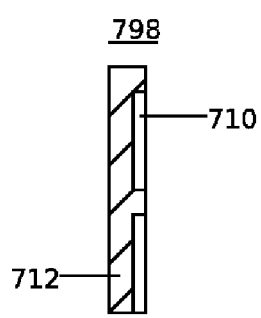
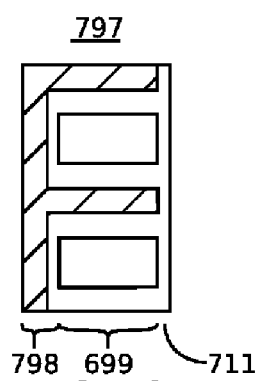
FIG 7A          FIG 7B          FIG 7C

METHOD OF MANUFACTURING MULTICOLORED ILLUMINATOR

This patent claims priority from provisional patent number 1058/MUM/2007 filed in Mumbai, India on 5 Jun. 2007.

TECHNICAL FIELD

The present invention relates to an illumination system. Particularly, the invention relates to a method for manufacturing a multicolored illuminator.

BACKGROUND ART

Flat screen color displays present in the art normally use illumination in the form of white light. The white light falls on the display such as LCD which uses color filters to depict colors. Color filters reduce efficiency of the display since large amount of light is absorbed. Another disadvantage is that because of the color filters the transmittance of the display is very low.

Another method known in the art is to stack dyed nematic crystal panels one after the other. White light is passed through them. Each layer subtracts some amount of the red, blue and green respectively from the white light according to the voltage applied to it and displays the colored image. But this also has a disadvantage of loss of light and hence reduced efficiency. It also suffers from parallax errors.

Large displays such as advertisement hoardings are presently made using white backlights and a colored picture on top of it. The color pigments in the colored picture reduce efficiency of the display.

Thus it is required to manufacture multicolored illuminators, so as to improve the efficiency of display systems like TVs and hoardings.

SUMMARY

A method of manufacturing a multicolored illuminator is disclosed. In an embodiment, a first transparent sheet comprising light diffusing particles is provided. Second and third transparent cladding sheets are provided on either sides of the first transparent sheet. A mirror is provided adjacent to the second sheet. The first sheet, second sheet, third sheet and mirror are merged to give a multicolored illuminator.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 5A illustrates a laminated structure, according to one embodiment.

FIG. 5B illustrates a larger laminated structure, according to one embodiment.

FIG. 5C illustrates an even larger laminated structure, according to one embodiment.

FIG. 6A illustrates a laminated structure, according to one embodiment.

FIG. 6B illustrates an etched laminated structure, according to one embodiment.

FIG. 6C illustrates a clad laminated structure, according to one embodiment.

FIG. 6D illustrates a clad laminated structure, according to one embodiment.

FIG. 6E illustrates a multicolored illuminator, according to one embodiment.

FIG. 7A illustrates a clad corrugated reflector, according to one embodiment.

FIG. 7B illustrates a clad corrugated reflector, according to one embodiment.

FIG. 7C illustrates a multicolored illuminator, according to one embodiment.

DETAILED DESCRIPTION

A method of manufacturing a multicolored illuminator is disclosed. In an embodiment, a first transparent sheet comprising light diffusing particles is provided. Second and third transparent cladding sheets are provided on either sides of the first transparent sheet. A mirror is provided adjacent to the second sheet. The first sheet, second sheet, third sheet and mirror are merged to give a multicolored illuminator.

Figure 1:
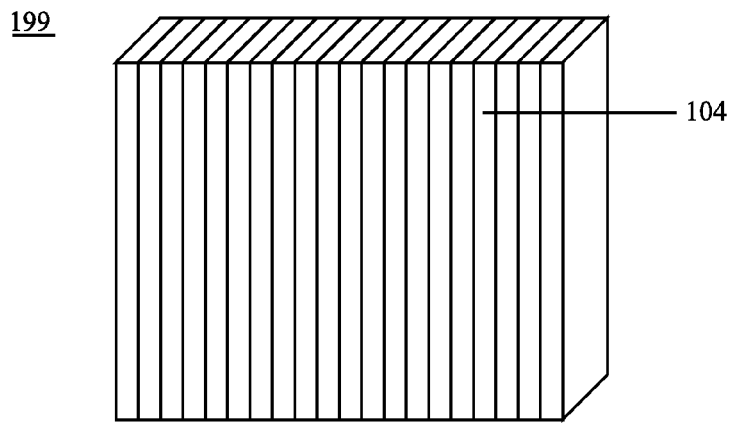
FIG. 1 illustrates a multicolored illuminator, according to one embodiment.

FIG. 1 illustrates a multicolored illuminator 199, according to one embodiment. Multicolored illuminator 199 comprises columns such as column 104. Different columns emanate light of a different color.

Figure 2A:
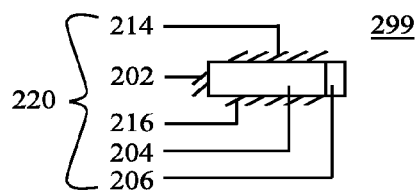
FIG. 2A illustrates a block diagram of a column of a multicolored illuminator as viewed from the top, according to one embodiment.

FIG. 2A illustrates a block diagram of a column 299 of a multicolored illuminator as viewed from the top, according to one embodiment. Column 299 comprises core 204, cladding 206 and mirrors 202, 214 and 216 which together form a light guide. Illuminator column core 204 has a higher refractive index than cladding 206. Light is guided inside the light guide 220 by reflection and total internal reflection. Illuminator column core 204 has a sparse distribution of light diffuser particles. Light diffuser particles diffuse light incident on them by reflection, refraction, total internal reflection or light scattering. Light diffuser particles may comprise a metallic powder, metallic pigment, organic powder, organic pigment, transparent particle, or transparent bubble. Light diffuser particles may be distributed uniformly throughout illuminator column core 204. In alternate embodiments, light diffuser particles may have different concentrations at different places in illuminator column core 204. Back-mirror 202 reflects light from the back surface of the illuminator column core 204. Side-mirrors 214, 216 reflect light from the side surfaces of column core 204. Side-mirrors 214, 216 prevent light from leaking into the adjacent columns. The mirrors 202, 214 and 216 may be standard mirrors or any light reflectors, including metallic surfaces, distributed Bragg reflectors, hybrid reflectors, total internal reflectors or omni-direction reflectors.

Figure 2B:
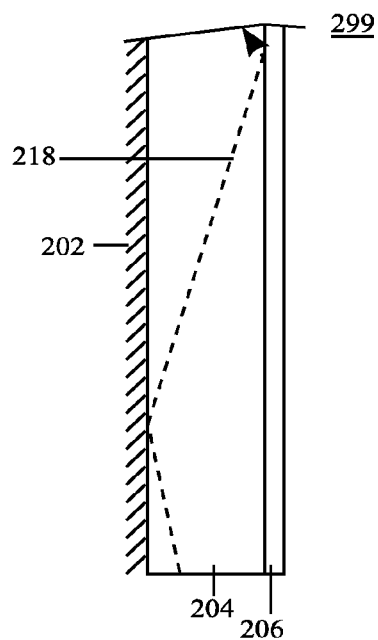
FIG. 2B illustrates a block diagram of a column of a multicolored illuminator as viewed from the side, according to one embodiment.

FIG. 2B illustrates a block diagram of a column 299 of a multicolored illuminator as viewed from the side, according to one embodiment. Illuminator column 299 comprises core 204, cladding 206, mirror 202 and other mirrors (not shown). Light ray 218 is guided inside the light guide by reflection or total internal reflection. Light from light ray 218 gets deflected by light diffuser particles in the core 204. Light in adjacent columns of a multicolored illuminator may be of different color.

Figure 2C:
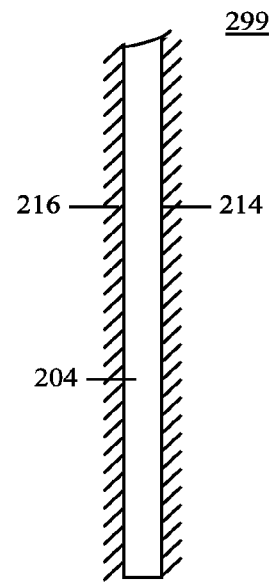
FIG. 2C illustrates a block diagram of a column of a multicolored illuminator as viewed from the front, according to one embodiment.

FIG. 2C illustrates a block diagram of a column 299 of a multicolored illuminator as viewed from the front, according to one embodiment. Illuminator column 299 comprises core 204, mirrors 214 and 216 and other mirrors and cladding (not shown).

Figure 3:
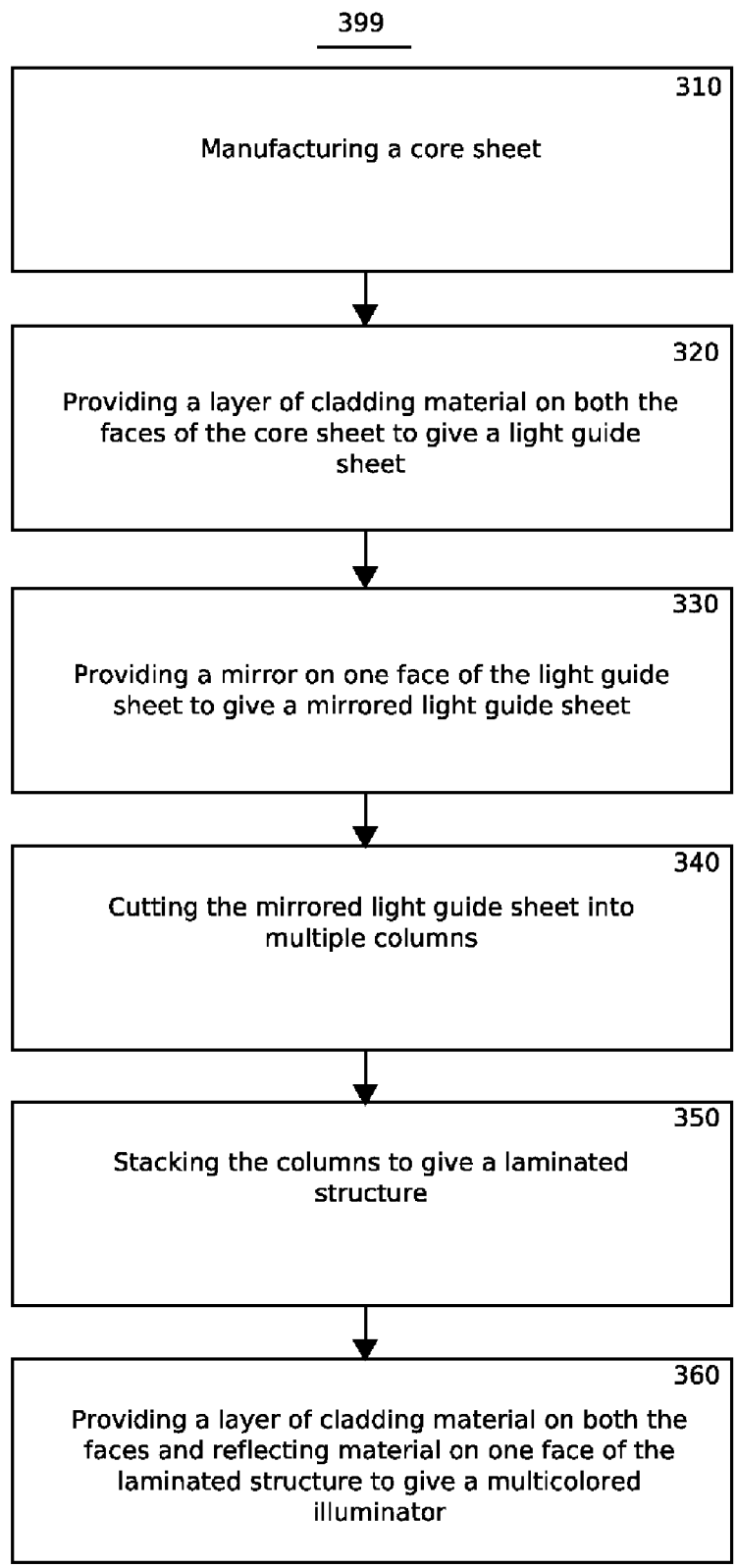
FIG. 3 illustrates a flow diagram illustrating a flow process of manufacturing a multicolored illuminator sheet, according to one embodiment.

FIG. 3 illustrates a flow diagram illustrating a flow process 399 of manufacturing a multicolored illuminator sheet, according to one embodiment. A core sheet is manufactured (310). The core sheet is an optically transparent sheet. In an embodiment, the core sheet is manufactured using polymerization of a monomer to form a polymerized sheet. In another embodiment, core material is formed into a sheet by calendering. In another embodiment, the core sheet is formed by die casting the core material using injection molding or extruder. When light is passed through the sheet from one or more edges, light is extracted from one or more faces of the sheet in a predetermined pattern. In an embodiment, diffuser particles are provided in the core sheet and by adjusting concentration of the diffuser particles, light is extracted in a predetermined pattern.

A layer of cladding material is provided on both the faces of the core sheet to give a light guide sheet (320). The cladding material is a transparent material with refractive index lower than the refractive index of the material of the core. According to one embodiment, the cladding sheets are formed and merged with the core sheet giving the light guide sheet. According to another embodiment, the cladding material is deposited on both the faces of the core sheet which gives the light guide sheet. In an embodiment, the cladding sheet is polymerized on the core sheet to give the light guide sheet. The cladding sheet provided by the above methods may be polished to provide an optical finish or required thickness.

A mirror is provided on one of the faces of the light guide sheet to give a mirrored light guide sheet (330). The mirror may be a metallic mirror, distributed Bragg reflector, omni-directional reflector or dielectric reflector. In an embodiment, a reflecting material is deposited on one of the faces of the light guide sheet. In another embodiment a reflecting sheet is merged with one of the faces of the light guide sheet. The reflecting sheet may be merged with the light guide sheet by fusing them or by using adhesive. In the case that the mirror is a multi-layered mirror such as a distributed Bragg reflector or an omni-directional reflector or a compound dielectric reflector, the multiple layers comprising the mirror may be formed by deposition or coating on one of the faces of the light guide sheet. In an embodiment, mirrors are provided on both the faces of the light guide sheet. In an embodiment, reflecting material is deposited on two opposing faces of the light guide sheet.

Optionally, the mirrored light guide sheet is cut to give multiple mirrored light guide sheets (340).

Mirrored light guide sheets are stacked on top of each other to give a laminated structure (350). These light guide sheets are joined together. The mirrored light guide sheets can be welded, glued using an adhesive, fused together or kept adjacent in a fixed arrangement. In an embodiment, this laminated structure is the multicolored illuminator. In another embodiment, the multicolored illuminator is formed by cutting a slice out of the laminated structure. In an embodiment, this laminated structure is cut into slices to give thinner laminated structures.

In an embodiment, larger laminated structures are created by stacking laminated structures.

The laminated structure is coated on both the faces with cladding material (360) to give a multicolored illuminator. In an embodiment, the cladding is material is air, any gas or vacuum. In an embodiment, a mirror is provided on one of the faces of the multicolored illuminator. The mirror may be a metallic mirror, distributed Bragg reflector, omni-directional reflector or dielectric reflector.

In an embodiment, before coating the faces of the laminated structure with cladding material, the core and cladding of the laminated structure are etched away partially, so that the mirrors in the laminated structure protrude partially out of the surface of the laminated structure. Then the cladding material is deposited and optionally polished, giving a clad laminated structure with exposed mirrors. Hence, a mirror is provided on one of the faces to give a multicolored illuminator with optically isolated cores.

Figure 4A:
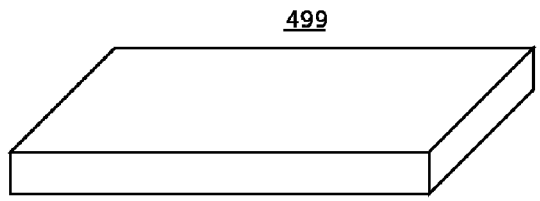
FIG. 4A illustrates a core sheet according to one embodiment.

FIG. 4A illustrates a core sheet 499 according to one embodiment. A core sheet 499 is manufactured.

Figure 4B:
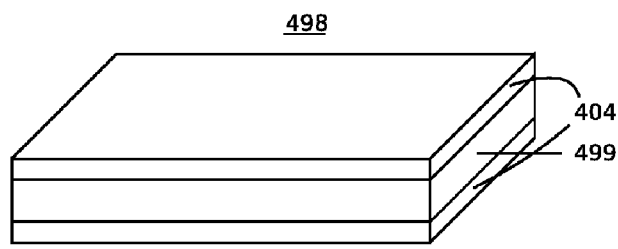
FIG. 4B illustrates a light guide sheet, according to one embodiment.

FIG. 4B illustrates a light guide sheet 498, according to one embodiment. A layer of cladding material 404 is provided on both the faces of the core 499 to give a light guide sheet. The cladding material is a transparent material with refractive index lower than the refractive index of the material of the core.

Figure 4E:
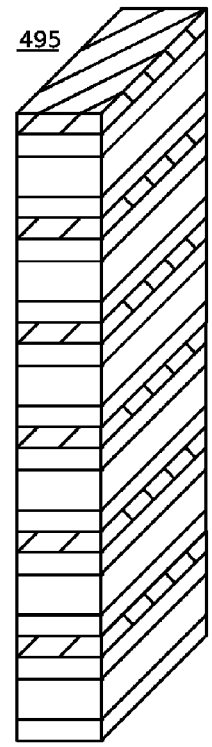
FIG. 4E illustrates a laminated structure, according to one embodiment.
Figure 4C:
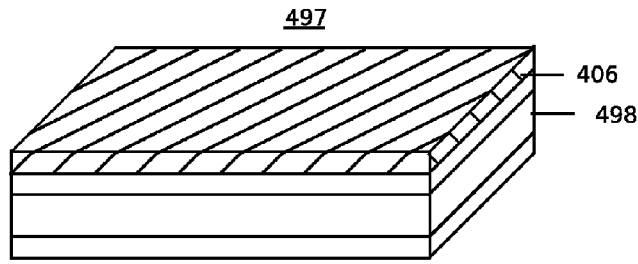
FIG. 4C illustrates a mirrored light guide sheet, according to one embodiment.

FIG. 4C illustrates a mirrored light guide sheet 497, according to one embodiment. A mirror 406 is provided on one of the faces of the light guide sheet 498 to give a mirrored light guide sheet 497. The mirror may be a metallic mirror, distributed Bragg reflector, omni-directional reflector or dielectric reflector. In an alternate embodiment, a mirror is provided on both the faces of light guide sheet 497.

Figure 4D:
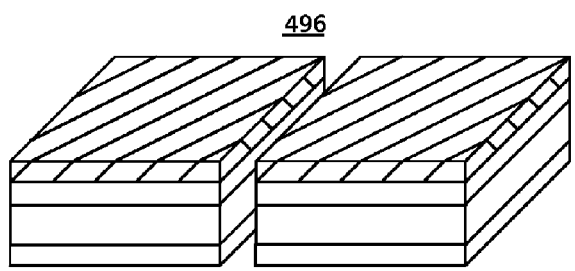
FIG. 4D illustrates multiple mirrored light guide sheets, according to one embodiment.

FIG. 4D illustrates multiple mirrored light guide sheets 496, according to one embodiment. A mirrored light guide sheet is cut to give multiple mirrored light guide sheets 496.

FIG. 4E illustrates a laminated structure 495, according to one embodiment. Mirrored light guide sheets are stacked such that the mirrors and core and cladding form alternating layers of a laminated structure 495. These light guides are joined together. In an embodiment, the laminated structure 495 is the multicolored illuminator. In another embodiment, the multicolored illuminator is formed by cutting a slice out of the laminated structure 495.

Figure 4F:
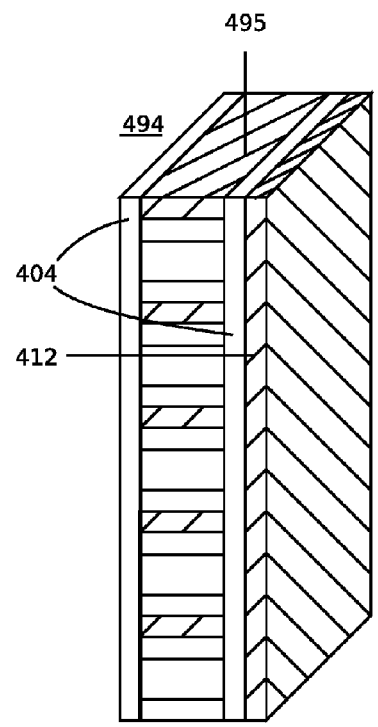
FIG. 4F illustrates a multicolored illuminator, according to one embodiment.

FIG. 4F illustrates a multicolored illuminator 494, according to one embodiment. The laminated structure is coated on both the faces with cladding material 410. A mirror 412 is provided on one of the faces. The mirror may be a metallic mirror, distributed Bragg reflector, omni-directional reflector or dielectric reflector.

FIG. 5A illustrates a laminated structure 599, according to one embodiment. Laminated structure 599 is formed as described in conjunction with FIG. 4.

FIG. 5B illustrates a larger laminated structure 598, according to one embodiment. Laminated structure 598 comprises smaller laminated structure 599 and smaller laminated structure 501 similar to laminated structure 599. Smaller laminated structures 599 and 501 are stacked and joined together.

FIG. 5C illustrates an even larger laminated structure 597, according to one embodiment. Laminated structure 597 is made by stacking and joining smaller laminated structures 598 and 502. This process of stacking and joining laminated structures to give larger laminated structures is continued till a laminated structure of required size is obtained.

Fault detection is done at every stage of this stacking and joining and faulty illuminators are rejected. Loss of material is thus reduced. In an embodiment, fault in a stacked structure of illuminators is detected by illuminating the illuminator columns from one or both edges, detecting the pattern of emanated light and comparing to a predetermined pattern. If the difference between the detected and predetermined pattern is larger than a predetermined value, the illuminator stack is detected as faulty and rejected. Fault detection may also be done by checking thickness, transparency, weight or other parameters of the stack of illuminators.

Isolation of Columns of Multicolored Illuminator

FIG. 6A illustrates a laminated structure 699, according to one embodiment. Laminated structure 699 has cores such as core 602, claddings such as cladding 604 and reflectors such as reflector 606.

FIG. 6B illustrates an etched laminated structure 698, according to one embodiment. The cores and claddings of a laminated structure are partly etched to produce etched cores such as etched core 622 and etched claddings such as etched cladding 624. Etched laminated structure 698 has etched cores such as core 622, etched claddings such as cladding 624 and reflectors such as reflector 606, which partly protrude from the surface of the structure.

FIG. 6C illustrates a clad laminated structure 697, according to one embodiment. Cladding 608 is deposited onto an etched laminated structure 698 to give a clad laminated structure 697. In an embodiment, the claddings of the original laminated structure, and the deposited cladding 608 merge to form a cladding 634 surrounding the cores of the clad laminated structure 697. In an embodiment, the clad laminated structure 697 is the multicolored illuminator.

FIG. 6D illustrates a clad laminated structure 696, according to one embodiment. In an embodiment, the cladding deposited on an etched laminated structure to form a clad laminated structure is polished to give a smooth cladding such as cladding 610, such that the mirrors such as mirror 606 are exposed. In an embodiment, the clad laminated structure 696 with a polished cladding, is the multicolored illuminator.

FIG. 6E illustrates a multicolored illuminator 695, according to one embodiment. A mirror 612 is deposited on one side of a clad laminated structure. In an embodiment, the clad laminated structure has exposed mirrors. The mirror 612 is then in direct contact with these exposed mirrors, so that each core in the laminated structure is optically isolated from other cores.

FIG. 7A illustrates a clad corrugated reflector 799, according to one embodiment. A reflector 712 with corrugations on it has cladding material 708 disposed on the corrugated surface. The reflector 712 may be made by casting or machining or other manufacturing process, and the cladding 708 may be deposited on top of it. In another embodiment, the cladding 708 with inbuilt corrugations may be made by casting, machining, patterning, etching, micro-replication or other manufacturing process, and the reflector 712 may be deposited on top of it.

FIG. 7B illustrates a clad corrugated reflector 798, according to one embodiment. In an embodiment, the cladding on a clad corrugated reflector is polished to give thinner cladding 710 so that the corrugations of the reflector 712 are exposed.

FIG. 7C illustrates a multicolored illuminator 797, according to one embodiment. Clad corrugated reflector 798 is merged with laminated structure 699 to give multicolored illuminator 797. In an embodiment, cladding material 711 is deposited on the surface opposite to the clad corrugated reflector 798. The exposed reflector corrugations in the clad corrugated reflector 798 are matched with the reflecting laminae in the laminated structure 699, so that each core in the laminated structure is optically isolated from other cores.

Transparent Illuminator

Light enters the core of each column of multicolored illuminator from one or both the ends of the core. If a uniform concentration of light diffuser is used in the core, the emanated power density of light drops exponentially with height. In order to get uniform emanated light or to get light emanated according to a predetermined pattern, the diffuser concentration has to be varied.

Figure 8A:
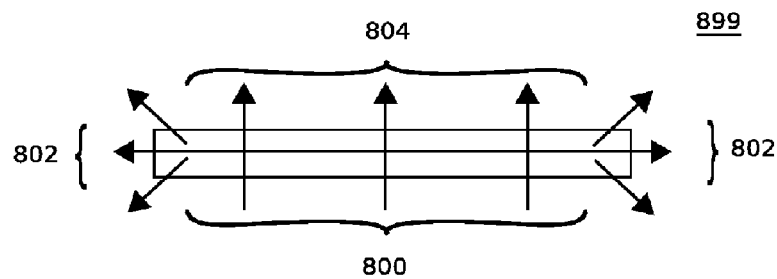
FIG. 8A illustrates a block diagram of an exemplary element of core of exemplary transparent light source, according to one embodiment.

FIG. 8A illustrates a block diagram of an exemplary element 899 of core of exemplary transparent light source, according to one embodiment. Core element 899 has the thickness and breadth of the core but has a very small height. Light 800 enters element 899. Some of the light gets dispersed and leaves the light guide as illumination light 802, and the remaining light 804 travels on to the next core element. The power of the light 800 going in is matched by the sum of the powers of the dispersed light 802 and the light continuing to the next core element 804. The ratio of the fraction of light dispersed 802 with respect to the light 800 entering the element 899, to the height of element 899 is the volume extinction coefficient of element 899. As the height of element 899 decreases, the volume extinction coefficient approaches a constant. This volume extinction coefficient of element 899 bears a certain relationship to the diffuser concentration at the element 899. The relationship permits evaluation of the volume extinction coefficient of core element 899 from the diffuser concentration of the core element 899, and vice versa.

As the height of element 899 is reduced, power in the emanating light 802 reduces proportionately. The ratio of power of the emanating light 802 to the height of element 899, which approaches a constant as the height of the element is reduced, is the emanated linear irradiance at element 899. The emanated linear irradiance at element 899 is the volume extinction coefficient times the power of the incoming light (i.e. power of light traveling through the element). The gradient of the power of light traveling through the element 899 is the negative of the emanated linear irradiance. These two relations give a differential equation. This equation can be represented in the form "dP/dh=−qP=−K" where:

h is the distance of a core element from that end of the core near which the primary light source is placed;

P is the power of the light being guided through that element;

q is the volume extinction coefficient of the element; and

K is the emanated linear irradiance at that element.

This equation is used to find the emanated linear irradiance given the volume extinction coefficient at each element. This equation is also used to find the volume extinction coefficient of each element, given the emanated linear irradiance. To design a particular light source with a particular emanated linear irradiance, the above differential equation is solved to determine the volume extinction coefficient at each element of the light source. From this, the diffuser concentration at each core element of the core, such as core 204, is determined. Such a core is used in a light guide, to give a light source of a required emanated linear irradiance pattern.

If a uniform concentration of diffuser is used in the core, the emanated linear irradiance drops exponentially with height. Uniform emanated linear irradiance may be approximated by choosing a diffuser concentration such that the power drop from the edge near the light source to the opposite edge is minimized. To reduce the power loss and also improve the uniformity of the emanated power, opposite edge reflects light back into the core. In an alternate embodiment, another light source sources light into the opposite edge.

To achieve uniform illumination, the volume extinction coefficient and hence the diffuser concentration has to be varied over the length of the core. This can be done using the above methodology. The required volume extinction coefficient is $q=K/(A−hK)$, where A is the power going into the core 204 and K is the emanated linear irradiance at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as volume extinction coefficient is always finite.

Figure 8B:
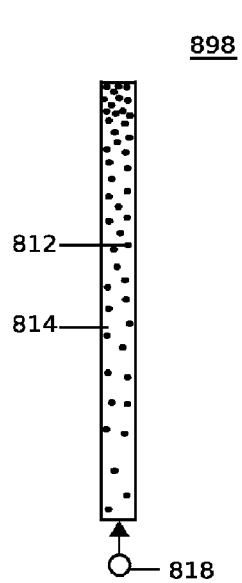
FIG. 8B illustrates a diagram of an exemplary column of multicolored illuminator having light source at only one, according to one embodiment.

FIG. 8B illustrates a diagram of an exemplary column 898 of multicolored illuminator 898 in which light enters from only one end, according to one embodiment. The concentration of the diffuser 812 is varied from sparse to dense from the light source end of core 814 to the opposite end.

Figure 8C:
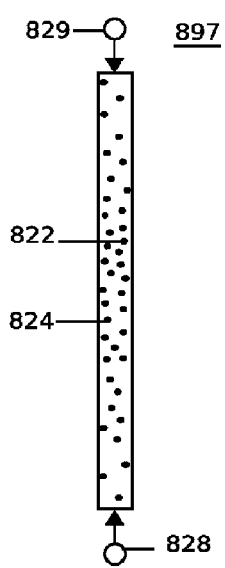
FIG. 8C illustrates an exemplary column of multicolored illuminator having two light sources, according to one embodiment.

FIG. 8C illustrates an exemplary column 897 of multicolored illuminator in which light enters from both ends, according to one embodiment. By using light sources 828, 829, which illuminate the core 824 from both ends, high variations in concentration of diffuser 822 in the core is not necessary. The differential equation provided above is used independently for deriving the emanated linear irradiance due to each of the light sources 828, 829. The addition of these two emanated linear irradiances provides the total emanated linear irradiance at a particular core element.

Uniform illumination for column 897 is achieved by volume extinction coefficient $q=1/\mathrm{sqrt}((h-H/2)\hat{\ }2+C/K\hat{\ }2)$ where sqrt is the square root function, ^ stands for exponentiation, K is the average emanated linear irradiance per light source (numerically equal to half the total emanated linear irradiance at each element) and $C=A(A−HK)$.

Figure 8D:
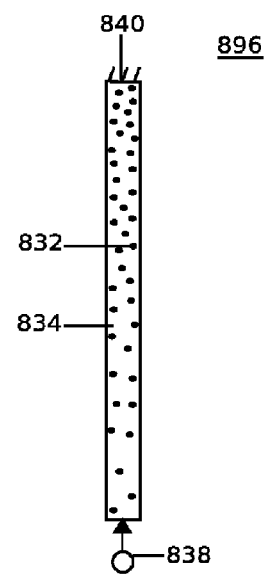
FIG. 8D illustrates a diagram of an exemplary column of multicolored illuminator having a mirrored core, according to one embodiment.

FIG. 8D illustrates a diagram of an exemplary column 896 of multicolored illuminator having a mirrored core 834, according to one embodiment. By using a mirrored core 834, high variations in concentration of diffuser 832 in the core 834 is not necessary. One edge 840 of the core 834 is mirrored, such that it will reflect light back into the core 834. The other edge of core 834 is illuminated by light from the light source 838. The volume extinction coefficient to achieve uniform illumination in column 896 is:

$$q=1/\mathrm{sqrt}((h-H)\hat{\ }2+D/K\hat{\ }2)$$

where $D=4A(A−HK)$.

Variable Diffuser Concentration Illuminator Core

This variation in diffuser concentration can be achieved by methods described below.

Figure 9A:
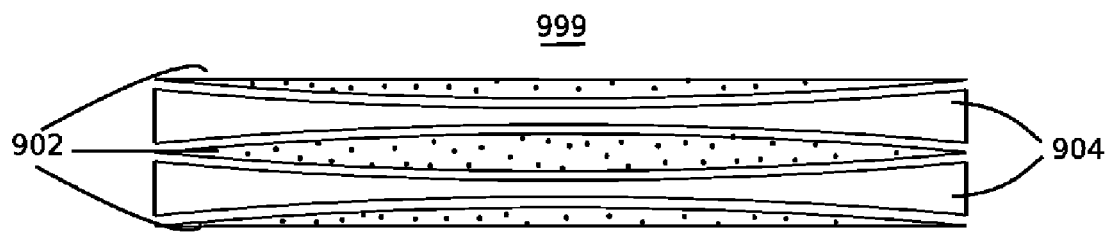
FIG. 9A illustrates a block diagram of an exemplary process of manufacturing of core sheet of sheets merged having variable thickness and different concentrations of diffuser particles, according to one embodiment.

FIG. 9A illustrates a block diagram of an exemplary process of manufacturing of core sheet 999 of sheets merged having variable thickness and different concentrations of diffuser particles, according to one embodiment. Sheets 902 and 904, have variable thicknesses and different particle concentrations in each sheet. In an embodiment, these layers are bound together by cementing material. According to an embodiment, the sheets 902 and 904 are in a molten state during the merging process, and fuse together due to heat. Such fusion may include diffusion of the particles from each sheet into the other. The variable thicknesses of the sheets are designed so as to get the required profile of concentration at the end of the manufacturing process.

Figure 9B:
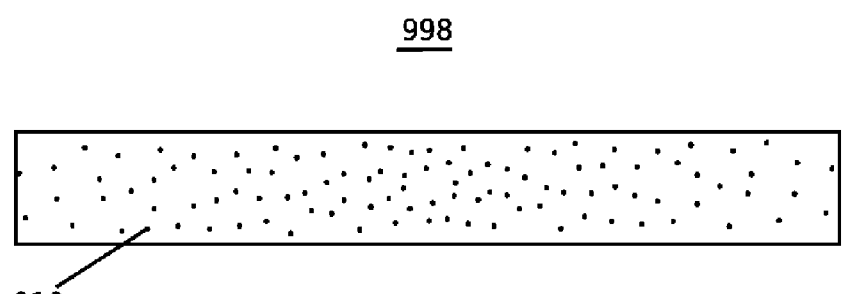
FIG. 9B illustrates a block diagram of an exemplary core sheet having a varying concentrations of diffuser particles, according to one embodiment.

FIG. 9B illustrates a block diagram of an exemplary core sheet 998 having a varying concentrations of diffuser particles 910, according to one embodiment.

Figure 9C:
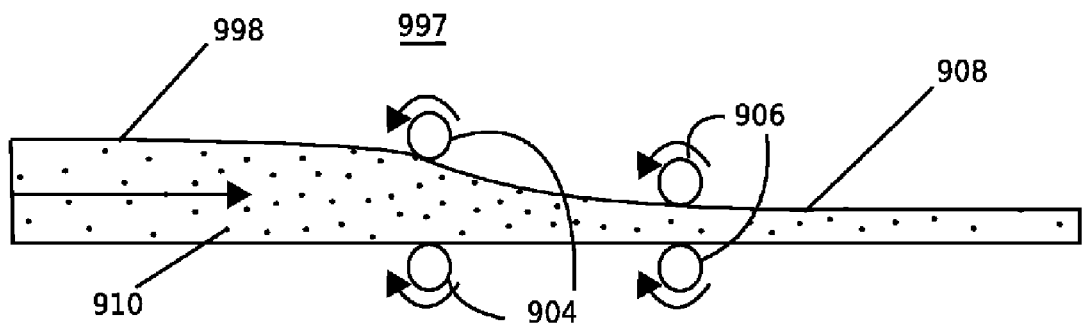
FIG. 9C illustrates a block diagram of exemplary core film, according to one embodiment.

FIG. 9C illustrates a block diagram of exemplary core film 999, according to one embodiment. A transparent sheet of core 998 has a varying concentration of diffuser particles 910 dispersed in it. This core 998 is passed through rollers 904, which press the film as they roll. The rollers 904 have a constant speed of rotation, which is different from speed of rotation of rollers 906. Amount of diffuser in a cross-section of core 998 varies according to some predetermined pattern. As the core is uniformly pressed by the rollers 904 and 906, the film 908 also maintains the variations in concentration of diffuser particles 910.

Figure 10A:
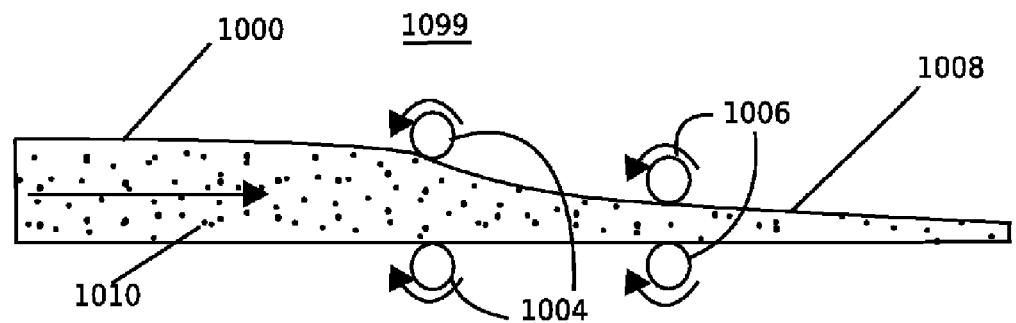
FIG. 10A illustrates a block diagram of multicolored illuminator, according to one embodiment.

FIG. 10A illustrates a block diagram of multicolored illuminator 1099, according to one embodiment. A transparent sheet of core 1000 has a uniform concentration of diffuser particles 1010 dispersed in it. This sheet 1000 is passed through rollers 1004 and rollers 1006, which press the film as they roll. In an embodiment, rollers 1004 have a constant speed of rotation, which is different from speed of rotation of rollers 1006. The speed of rotation of rollers 1006 is varied. The sheet 1000 is non-uniformly stretched to produce sheet 1008. Thus amount of diffuser in a cross-section of sheet 1008 has an inverse relation to the stretching it undergoes and a direct relation to speed of the rollers 1006.

Figure 10B:
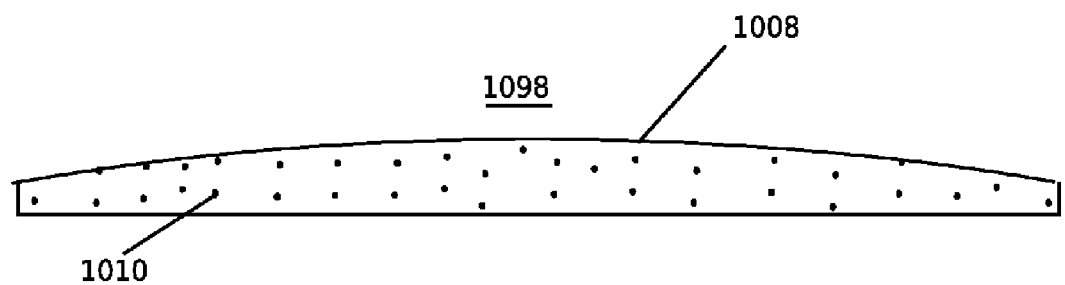
FIG. 10B illustrates a block diagram of an exemplary core sheet having a varying thickness, according to one embodiment.

FIG. 10B illustrates a block diagram of an exemplary core sheet 1098 having a varying thickness, according to one embodiment. Diffuser particles 1010 are embedded in the core sheet 1008

Figure 10C:
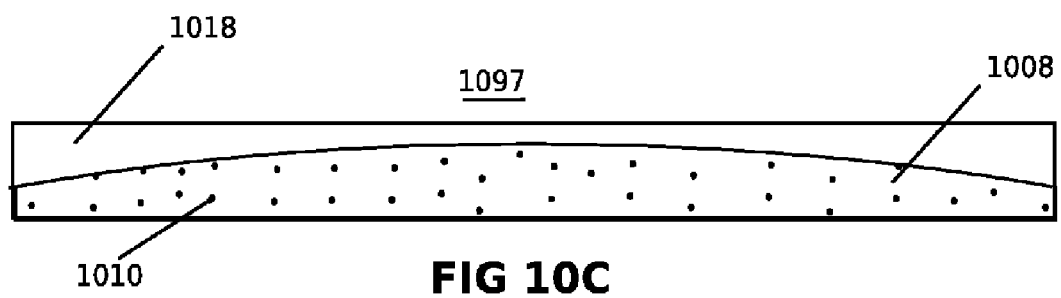
FIG. 10C illustrates a block diagram of an exemplary core sheet having a varying concentrations of diffuser particles, according to one embodiment.

FIG. 10C illustrates a block diagram of an exemplary core sheet 1097 having a varying concentrations of diffuser particles 1010, according to one embodiment. A sheet 1018 of the same material as core sheet 1008 is fused to the core sheet 1008. This gives variable diffuser concentration core sheet 1097.

Figure 11:
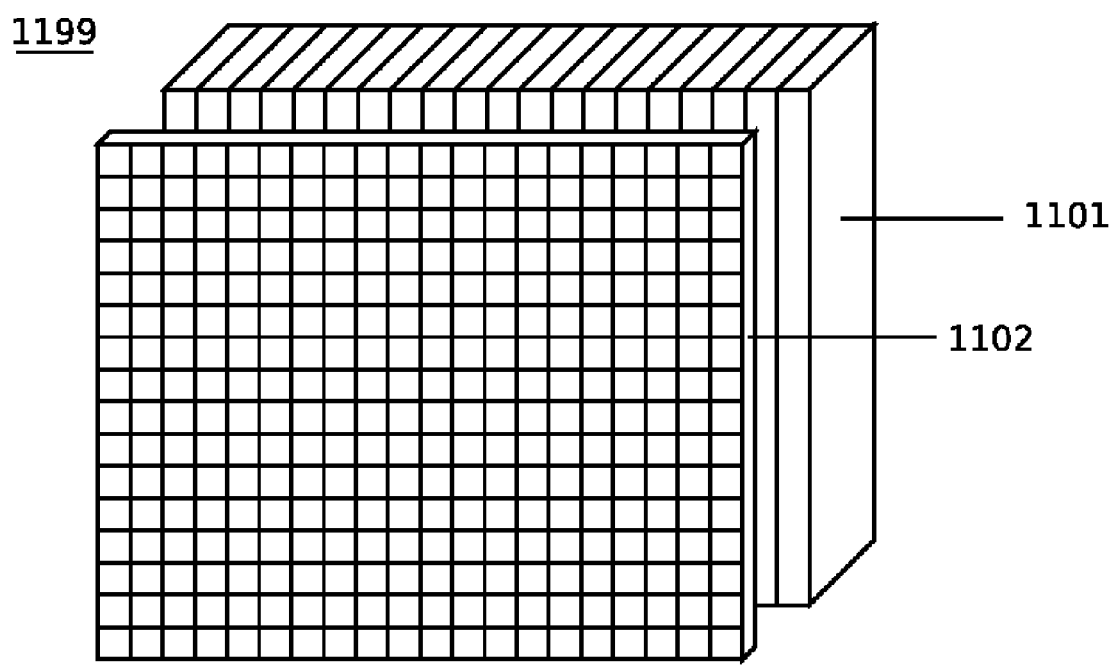
FIG. 11 illustrates a block diagram of an exemplary backlit display, according to one embodiment.

FIG. 11 illustrates a block diagram of an exemplary backlit display 1199, according to one embodiment. An image is displayed on a flat panel screen 1102. In an embodiment, the flat panel screen 1102 is a liquid crystal display. In another embodiment, the flat panel screen 1102 is a fixed display displaying a fixed image. Multicolored illuminator 1101 comprises a number of illuminator columns. Each illuminator column illuminates one column of pixels. Different illuminators emanate light of different colors. Thus, light illuminating different pixel columns is of different colors. In an alternate embodiment, the illuminator column is not vertical.

A method for manufacturing multicolored illuminator is disclosed. It is understood that the embodiments described herein are for the purpose of elucidation and should not be considered limiting the subject matter of the present patent. Various modifications, uses, substitutions, recombinations, improvements, methods of production without departing from the scope or spirit of the present invention would be evident to a person skilled in the art.

The invention claimed is:

1. A method of manufacturing multicolored illuminator, the method comprising:
   manufacturing a core sheet;
   providing a layer of cladding material on both the faces of the core sheet to form a light guide sheet;
   cutting the light guide sheet into multiple columns; and
   stacking the columns to form a laminated structure.

2. The method of claim 1, wherein the step of providing a layer of cladding material on both the faces of the core sheet further comprises providing a mirror on one of the faces of the light guide sheet.

3. The method of claim 1, further comprising providing a layer of cladding material on at least one of the faces of the laminated structure.

4. The method of claim 3, comprising partially removing the core and cladding of the columns of the laminated structure before providing the layer of cladding material.

5. The method of claim 4, further comprising polishing the layer of cladding material.

6. The method of claim 1, further comprising providing a mirror on one of the faces of the laminated structure.

7. The method of claim 6, wherein the mirror comprises a reflector with corrugations.

8. The method of claim 1, wherein the core sheet includes light diffusing particles.

9. The method of claim 8, comprising providing the light diffusing particles in a uniform concentration throughout the core sheet.

10. The method of claim 8, comprising providing the light diffusing particles in different concentrations at different parts of the core sheet, the concentrations being chosen such that the light emanated from the laminated structure is of a predetermined pattern.

11. The method of claim 10, comprising merging curved sheets with various concentrations of light diffusing particles to produce a core sheet including light diffusing particles in different concentrations at different places.

12. The method of claim 11, wherein curved sheets are produced by non-uniform stretching.

13. The method of claim 11, further comprising stretching a sheet including light diffusing particles in different concentrations at different places to form a second sheet including light diffusing particles in different concentrations at different places.

* * * * *